United States Patent [19]

Farrar et al.

[11] Patent Number: 4,835,206

[45] Date of Patent: May 30, 1989

[54] WATER SOLUBLE POLYMERIC COMPOSITIONS

[75] Inventors: David Farrar, Bradford; John G. Langley, Shipley; Adrian S. Allen, Skipton, all of England

[73] Assignee: Allied Colloids, Ltd., England

[21] Appl. No.: 103,190

[22] Filed: Sep. 30, 1987

[30] Foreign Application Priority Data

Oct. 1, 1986 [GB] United Kingdom ................. 8623578
Oct. 1, 1986 [GB] United Kingdom ................. 8623579

[51] Int. Cl.$^4$ .................... C08F 265/00; C08L 33/00; C08L 77/00
[52] U.S. Cl. .................................. 524/457; 524/458; 524/555; 524/606; 524/612; 524/732; 524/733; 524/734; 525/187; 525/217; 525/218; 525/243; 525/293; 525/296; 525/329.4; 525/417; 525/426; 525/430; 525/529; 525/530; 525/540; 525/931

[58] Field of Search ............... 525/217, 218, 243, 293, 525/296, 186, 187, 329.4, 331.4, 417, 426, 529, 530, 540, 931; 524/500, 501, 502, 514, 521, 538, 457, 4 SB, 555, 606, 612; 527/312

[56] References Cited

U.S. PATENT DOCUMENTS

| | | | |
|---|---|---|---|
| 3,941,736 | 3/1976 | Aldrich | 525/187 |
| 4,056,432 | 11/1977 | Slagel | 527/312 |
| 4,684,708 | 8/1987 | Deets | 527/312 |
| 4,699,951 | 10/1987 | Allenson | 525/218 |

Primary Examiner—John C. Bleutge
Assistant Examiner—David Buttner
Attorney, Agent, or Firm—Ostrolenk, Faber, Gerb & Soffen

[57] ABSTRACT

A homogenous blend is formed of different water soluble polymer types, for instance of particular addition and condensation polymers, by forming one of the polymers from its monomeric starting material by polymerisation in a solution of the other polyer. The resultant solution has a concentration of above 10% but is homogenous. It can be used as a bulk solution or can be dried to powder or can be present as a reverse phase dispersion.

9 Claims, No Drawings

WATER SOLUBLE POLYMERIC COMPOSITIONS

It is common practice to treat an aqueous substrate with two or more different water-soluble, organic treatment materials, for instance for coagulation and flocculation of impurities in the substrate. Treatment can be sequential. Either or both of the materials can be supplied to the user as a concentrated aqueous solution, e.g., having a dissolved solids content above 10%, and the user then either uses this by direct addition to the aqueous substrate or, more usually, dilutes it prior to use.

In some instances however it is desirable to treat the substrate with the materials simultaneously and it would then generally be desirable to provide the two materials as a single composition. When the materials are of a character such that it is desirable to provide them as a concentrated solution this necessitates the provision of a concentrated aqueous solution containing both materials.

Some combinations of treatment materials are compatible in the sense that a stable homogeneous aqueous concentrated solution is obtained by stirring an aqueous solution of one material with an aqueous solution of the other material at a concentration such that the final aqueous solution has a total dissolved solids content of at least 10% by weight. For instance this is generally the situation if the two materials are of similar chemical types, e.g., polymers formed from the same monomer but to different molecular weights or formed from monomer blends that are the same or similar. However many combinations of water treatment materials are incompatible in solution at these high concentrations, even though they may be compatible at the much lower concentrations prevailing during use. For instance if a 25% aqueous solution of a high molecular weight cationic acrylate polymer is blended with a 25% by weight aqueous solution of a low molecular weight polymeric coagulant, the resultant aqueous solution will generally be heterogeneous and unstable, generally leading to phase separation or precipitation upon storage. Attempts at imparting stability by including emulsifier or other stabilising additives in the solution are undesirable for cost reasons and because the additives are liable to interfere with the intended use of the composition.

Instead of supplying to the user a single aqueous composition it might be thought preferable to supply a single dry particulate composition. However this tends to be unsatisfactory since some of the relevant materials tend to have a molecular weight and other characteristics such that they cannot readily be provided as particulate solids having suitable characteristics, and even if both materials can be provided as particulate solids there is a tendency for the different solids to stratify during transport and storage, with the result that the composition of the blended material may vary.

It is known to provide a polymer of diallyl dimethyl ammonium chloride (DADMAC) of higher molecular weight than would otherwise be available by conducting the polymerisation of DADMAC in the presence of poly DADMAC. It is also known to combine a polyelectrolyte and an inorganic coagulant (e.g. U.S. Pat. No. 4,582,627).

However these processes are not relevant to the need to provide a stable composition of entirely different polymer types, and in particular to provide such a composition where one of the types may be incapable of forming a satisfactory particulate solid form and/or where the different types are incompatible in concentrated aqueous solution.

A composition according to the invention comprises a blend of first and second water-soluble materials in a weight ratio 10:1 to 1:20 and in this composition the first material is a water-soluble polymer selected from polymer types of the group (1a) polymers of dialkylaminoalkyl (meth) acrylates, (1b) polymers of dialkylaminoalkyl (meth) acrylamides, (1c) polymers of diallyldialkyl ammonium halides and (1d) polymers formed between an amine and epihalohydrin or dihaloalkane, and the second material is a water-soluble material that is selected from cationic polymers of a polymer type different from the polymer type of the first material and selected from polymer types of the group (2a) polymers of dialkylaminoalkyl (meth) acrylates, (2b) polymers of dialkylaminoalkyl (meth) acrylamides, (2c) polymers of diallyldialkyl ammonium halides, (2d) polymers formed from an amine and epihalohydrin or dihaloalkane, (2e) polyamides, (2f) polyethylene imines and, (2g) natural polymers, and the blend is a homogeneous blend that has been made by a process comprising forming the first material by polymerisation from its monomeric starting material in an aqueous solution of the second material.

The composition is generally supplied to the user in form of a bulk aqueous concentrated solution in which the total concentration of the first and second materials is generally at least 10% by weight. The invention is of particular value in such solutions since many combinations of materials are incompatable in such solutions. The materials preferably have high charge density.

The compositions can also be in particulate form. The particles can be of such a concentrated solution or they can be dry particles made by drying such a solution. Generally substantially every particle is itself a homogeneous blend of the two materials. The particles may be the particles of a reverse phase dispersion, generally having a dry size below 10 $\mu$m, dispersed in a non-aqueous liquid, but preferably are dry powder particles. These may have been made by bulk gel polymerisation of the first material dissolved in a solution of the second material followed by communition and drying, e.g. to form. particles mainly in the dry size range 50 to 1000 $\mu$m, but preferably the dry particles are beads of size 50 to 1000 $\mu$m, or crushed beads, made by reverse phase bead polymerisation of droplets of the first material dissolved in an aqueous solution of the second material, while dispersed in a non-aqueous liquid.

The reverse phase processes of the invention are advantageous since the final product can have a very high charge density and can be formed of polymers that are incompatible. The production of a dried product in the invention is advantageous as some of the water that would otherwise be necessary for dissolving the monomers for the first polymeric material can be replaced by dissolved second material, thus reducing the amount of water that has to be evapourated.

Since the first and second materials are present to perform two different functions, it is inevitable that they are formed from different polymer types and this leads inevitably to some degree of incompatability. The invention is of particular value when the first material is incompatible with the second material when aqueous solutions of the first and second materials are mixed to provide the concentrations that exist in the composition (when it is an aqueous concentrate) or that exist during its manufacture (when it is a dry particulate material). Thus when these solutions of first and second materials are merely stirred together the resultant composition will undergo phase separation or precipitation upon storage for, for instance, 1 day. In contrast, as a result of forming the first polymer by polymerisation in a solution of the second material, there is substantially no tendency for phase separation or precipitation even though the solution is preferably totally or substantially free of dispersing agent, surfactant, emulsifier, cosolvent or any other stabilising or compatabilising material that might serve to reduce incompatability.

The concentrated solution, or the solution that is dried to form the dry particles of the invention can often be regarded as a stable molecular dispersion of the first material in the solution of the second material.

By this we mean that the dispersion is on a molecular scale and thus is very much finer than is obtainable merely by blending a solution of the first material with a solution of the second material, because of the non-homogeneous character of such a blend. Whether or not a molecular dispersion does exist is indicated by the stability of the product. If first and second materials are present in the solution at concentrations at which they normally phase separate but phase separation does not occur even though no emulsifier or other stabilising additive is present, then it follows that the first material is in a molecular dispersion with the solution of second material.

The monomeric starting material for the first material is preferably a true monomer or a blend of monomers but sometimes can be a prepolymer. Usually all the monomeric starting material is dissolved in the aqueous solution of second material before polymerisation starts. However in some instance the first material is made from starting materials that include a monomer that is best introduced separately, e.g., as a gas, in which event polymerisation may be caused by bubbling the gaseous monomer into an aqueous solution of the other monomer and of the second material.

The solution before polymerisation is preferably substantially homogeneous. Thus there is intimate distribution of the second material and the monomeric starting material, and so the polymerisation leads to the formation of an intimate distribution of molecules of the first polymer and molecules of the second material. In some instances the distribution may be such that some or all of the polymer grafts on to the second material. This is despite the fact that the second material is often a material that does not have active sites on it at which the monomer or monomer blend would be expected to polymerise. Naturally the choice of second material, monomeric starting material, concentrations and degree of polymerisation should not be such that the first material is precipitated out of solution.

Each of the first and second materials are usually present in the aqueous concentrate, or the solution from which the dry particles are formed, in an amount of at least 2% and usually at least 10% by weight. The amount of each is usually not more than 50% and is generally below 30 or 40%. The combined concentration of the first and second materials is at least 10% and is generally at least 15%, and often above 20%. It is usually not more than 50 or 60%. All these percentages are by weight on the total solution of water and first and second materials.

The optimum proportions of first and second materials depend upon the particular materials being used and the intended uses but generally range from 1:10 to 10:1, often 5:1 to 1:5. However when one of the materials is a coagulant and the other is a higher molecular weight polyelectrolyte the ratio of coagulant:polyelectrolyte is generally in the range 10:1 to 1:2 preferably 5:1 to 1:1.5.

The monomeric material must be capable of polymerising in the aqueous solution to form a dissolved polymer having the desired molecular weight. Adequate polymerisation by an aqueous-elimination condensation polymerisation (i.e., polymerisation by condensation of two monomers with elimination of water) may be difficult to perform to the desired molecular weight and concentration. Preferably, therefore, any condensation polymerisation is by an addition polymerisation or by an anhydrous-elimination condensation polymerisation. Suitable anhydrous elimination condensation processes involve the condensation of monomers with elimination of a compound other than water, generally hydrogen chloride or other halide.

Thus one preferred type of first polymer is type 1d, namely a polymer made by reaction of an amine with epihalohydrin or a dihaloalkane. The halo group is generally chloro. The amine is a diamine or other polyamine. Throughout this specification, alkyl and alkane groups are preferably $C_{1-8}$, usually $C_{1-4}$, unless otherwise stated. Preferred first polymers of this type include the quaternary reaction products of suitable amine containing compounds such as ammonia, dialkylamines or, preferably, polyamines, e.g., ethylene diamine or tetraethylene pentamine, with a material such as epichlorhydrin. The polyamine can be a polyamide or other compound having unreacted amine groups. Other preferred polymers of this same general type are reaction products of dichloroethane with suitable amines such as dimethylamine.

Preferably the monomeric material is polymerised in the aqueous solution of second material by addition polymerisation. The first material therefore is preferably an addition polymer, generally made by vinyl or allyl addition polymerisation of one or more water soluble ethylenically unsaturated monomers When the first polymer is made by allyl addition polymerisation, it is preferably a polymer of type 1c. The alkyl groups are usually $C_{1-4}$ and it is preferably a polymer of diallyldimethyl ammonium chloride (DADMAC) Such polymers typically have a molecular weight below 1 million.

Preferably the first polymer is an acrylic addition polymer.

Type 1b polymers are preferably formed from a dialkylaminoalkyl (meth) acrylamide in which event the alkyl group of the aminoalkyl group contains 2 to 8 carbon atoms (especially being 1,3-propylene) since stability of the blended polymer solutions is more difficult to achieve with these polymers than when the alkyl group of the aminoalkyl is methyl.

For many purposes however the preferred first polymer is a type 1a polymer in which event the cationic monomer is a dialkylaminoalkyl (meth) acrylate where the alkyl group of the aminoalkyl group contains, preferably, 1 to 8 carbon atoms, most preferably 2 carbon atoms.

The cationic monomers of types 1a and b are generally present as acid addition salts -or quaternary ammonium salts, generally quaternised with methyl chloride or dimethyl sulphate. Particularly preferred cationic monomers are quaternary salts of dimethylaminoethyl (meth) acrylate and quaternary and acid salts (generally with sulphuric acid) of dimethylamino propyl (meth) acrylamide.

Polymers of types 1a, 1b and 1c can be homopolymers or can be copolymers, the comonomer generally being nonionic, typically acrylamide. The amount of cationic monomer in the monomer blend typically is 5 to 95% by weight, generally 10 or 20% up to 50% or more.

The polymerisation by which types 1a, 1b or 1c are made may be conducted to any suitable molecular weight. This is usually above a few thousand, and generally is above 50,000 especially since compatibility problems may not arise at lower values. Generally the molecular weight of the addition polymers is above 100,000. If the first polymer is to serve as a coagulant, e.g., for reducing turbidity, the molecular weight may be below 1 million, for instance 100,000 to 700,000. When the polymer is to be of relatively low molecular weight, it can be of types 1a or 1b (generally as homopolymers) but is preferably formed of DADMAC alone or with acrylamide.

Generally it is preferred for the first polymeric material to be an addition polymer of high molecular weight, i.e., above 1 million and generally above 1.5 or 2 million, preferably 4 to 10 million or higher. Accordingly the material may serve as a flocculant and may have typical flocculant molecular weights.

The second material may be a natural polymer (type 2g) such as a cationic starch or cationic a cellulosic material such as chitosan, or other cationic natural polymer, but preferably it is a synthetic polymer. It may be a high molecular weight polymer made by addition polymerisation of any of the cationic ethylenically unsaturated monomers that are capable of forming high molecular weight polymers, e.g. as discussed above for types 1a and 1b. However it is often preferred for the second material to be of low molecular weight, generally below 1 million, often below 700,000, in which event the second material may serve as a polymeric coagulant and may be suitable for, for instance, reducing the turbidity of a liquor.

Low molecular weight addition polymers of types 2a or 2b can be copolymers but are often homopolymers. Suitable polymers are as discussed above for types 1a and 1b.

Particularly preferred second materials are allyl addition polymers such as discussed above for type 1c, especially polyDADMAC, and condensation polymers, since such materials all tend to give low molecular weight materials that tend to be incompatible with the preferred first materials and/or to be incapable of giving easily handable solid grade materials by easy techniques.

The condensation polymers may be made by anhydrous elimination reactions, and in particular may be polymers made by reaction of an amine with an epihalohydrin or dihaloalkane, as discussed above for type 1d. Alternatively they may be made by aqueous elimination reactions, especially polyamides of type 2e. Suitable polyamides are reaction products of diamines or higher polyamines with diacids or higher acids, such as the reaction products of ethylene diamine with adipic acid. Polyethylene imines, type 2f, are often particularly preferred.

The preferred polymers for use as the second material are homopolymers of DADMAC and copolymers with acrylamide, polyamides (such as reaction products of polyamines such as ethylene diamine and diacids such as adipic acid), polyamines (including the reaction products of amines with epichlorhydrin or dichloroethane, as described above), polyethylene imine and other cationic condensation polymers.

It is particularly preferred that the first material should be a high molecular weight polymeric material of types 1a or 1b and that the second material should be a low molecular weight polymeric material of types 2a to 2f. In particular the second material is preferably a polymer of types 2c to 2f.

In one particularly preferred composition, the first material is a high molecular weight polymer (preferably a homopolymer) of dimethyl aminomethyl (meth) acrylate (generally as acid addition or, preferably, quaternary salt) and the second material is a polymer of DADMAC. These compositions are of particular value for clay stabilisation.

Another preferred class of composition is a blend of a polyamine polymer with, as second material, a water-soluble polyamide. The polyamide may be a condensation product of tetraethylene pentamine or ethylene diamine or other suitable polyamine with adipic acid or other suitable polyacid. The polyamine is made by polymerisation, within the aqueous solution of polyamide, of suitable amino and halogen compounds, preferably tetraethylene pentamine or ethylene diamine or other polyamine, often together with dimethylamine, with epichlorhydrin. These compositions are of particular value for sizing paper.

To make the compositions of the invention, a solution of the second material may first be made either by dissolving preformed second material in water or, when it is a polymeric second material, by forming the second material by polymerisation in water (e.g. by condensation polymerisation when the second material is a condensation polymer). The monomeric material for the first material may then be dissolved in the solution and polymerised. For instance the solution may be degassed and polymerisation then initiated by, for instance, a thermal or redox initiator in conventional manner.

If the composition is to be supplied as an aqueous concentrate then the amounts of the first and second materials are preferably such that the product of the polymerisation is sufficiently fluid that it can be easily handled and diluted with water when required.

If the composition is to be a comminuted bulk gel, then the polymerisation solution must be sufficiently concentrated that a comminutable gel is obtained, which can then be dried and comminuted in conventional manner.

If the composition is a reverse phase dispersion of particles of the blend or if the composition is to be dried beads of the blend, then a suspension is formed in non-aqueous liquid of droplets of a solution of the monomeric first material in an aqueous solution of the second material, and the monomeric material is polymerised by reverse phase polymerisation while dispersed in the non-aqueous liquid. Some or all of the monomeric material may be added after formation of the initial suspension of second material.

The reverse phase polymerisation may be conducted in conventional manner using conventional non-aqueous liquids and conventional emulsifiers and/or polymerisation stabilisers.

The final particle size depends primarily on the particle size of the aqueous monomer droplets containing the second water soluble material and this can best be selected by appropriate choice of emulsifier (if present) and shearing or other agitation conditions used for the formation of the initial aqueous dispersion of monomer in non-aqueous liquid. Any of the conventional non-aqueous liquids customarily used for reverse phase polymerisation can be used. If the final composition is to be a dispersion in oil, some or all of the liquid present during polymerisation can be removed and optionally replaced by another non-aqueous liquid to provide the final composition.

The composition is preferably substantially anhydrous and is best formed by conducting the reverse phase polymerisation as described above followed by dehydration of the resultant aqueous dispersion, generally by azeotropic distillation.

If the particle size is relatively large, e.g. above 50 $\mu$m dry size, the resultant bead shaped particles are generally separated from the non-aqueous liquid, e.g. by centrifuging. If the particle size is small e.g. below 10 $\mu$m dry size, the final composition is generally used as a reverse phase dispersion of these particles. For instance it may be dispersed into water, optionally in the presence of an oil-in-water emulsifier, whereupon the first and second materials will dissolve into the water.

Although all the first and second materials used in the various compositions of the invention must be water soluble in the sense that they are capable of individually forming stable aqueous compositions in the absence of emulsifier or surfactant, they can have some slight degree of insolubility and thus the polymers can be slightly cross linked or otherwise insolubilised, for instance as described in EP202780.

The compositions of the invention can be used whenever it is beneficial to dose simultaneously the two different materials to an aqueous substrate such as an aqueous solution containing turbidity and/or suspended solids, or an aqueous liquor containing solids that are to be conditioned.

One especially preferred use is clay stabilisation downhole in that a combination of a high molecular weight cationic polyelectrolyte as the first material and a low molecular weight cationic polymer as the second material is very effective to prevent swelling of the clay and prevent breakdown of the unswollen clay granules.

Other valuable uses for the solutions are as coagulants (that will give good settlement) of various aqueous liquors such as for potable water treatment, sewage sludge clarification of deinking liquors, paper sizing, clay flotation coagulants for mining purposes such as coal and iron ore beneficiation, and as textile dye fixatives.

The reverse phase dispersions of the inventions are of particular value when applied to the production of an anhydrous concentrate composition suitable, upon dilution with water, for sizing cellulosic fibres. Such compositions and their use are described in EP 0141641 and 0200504 and comprise a substantially anhydrous dispersion of particles of cationic polyelectrolyte in a liquid phase comprising the reactive size. A water-releasable organic polymeric coagulant is, in the invention, trapped within the individual particles of polyelectrolyte.

Such compositions can be made by forming a dispersion in a non-aqueous liquid of an aqueous solution of organic coagulant and water soluble cationic ethylenically unsaturated monomer or monomer blend and polymerising the monomer or monomer blend by reverse phase polymerisation, dehydrating the resultant dispersion and blending it with the reactive size. Thus as a result of polymerisation the coagulant is trapped within the individual particles of polyelectrolyte. However since the polyelectrolyte is water soluble the compound is released by water when the polyelectrolyte particles are contacted with water.

Any reactive size can be used. For instance it can be a ketene dimer reactive size but the invention is of particular value when the size is an anhydride reactive size such as an alkenyl succinic anhydride reactive size. Suitable materials are described in U.S. Pat. No. 3,102,064.

The liquid phase in the final product can be solution of the reactive size in a hydrophobic solvent (as in EP 0141641) in which event the reactive size may be solid or liquid at room temperature, or the liquid phase may be a liquid reactive size in the substantially absence of solvent, as in EP0200504.

The amount of polymeric coagulant is generally at least 10% and preferably at least 20% to 30%, but generally below 60% and preferably below 50% based on the weight of polyelectrolyte. Based on the weight of size the amount is generally at least 1% and preferably at least 3%, and is generally below 20% and preferably below 12%. The concentration of coagulant based on the total composition is generally at least 1% and often at least 2.5%, but is generally below 20% and often below 10% by weight. Proportions of the other components may be as described in EP 0141641 and 0200504. The compositions make it possible to obtain sizing results as good as those obtainable by separately supplying polymeric coagulant and anhydrous concentrate, or separately supplying reactive size, polyelectrolyte and polymeric coagulant but with the advantage that all the necessary components can be supplied to the mill in a single stable concentrated composition.

The following are some examples. In these DADMAC is diallyldimethyl ammonium chloride, QMeCl means quaternised dimethyl chloride, DMAEMA means dimethylaminoethyl methacrylate, and ADTEP resin means a condensation product of adipic acid and tetraethylene pentamine.

EXAMPLE 1

A solution was formed of 136 g aqueous 73.5% DMAEMA.QMeCl, 200 g 50% aqueous polyamine epichlorhydrin and 664 g water and was charged to a resin pot equipped with mechanical stirrer, thermometer and condenser. It was heated to 70° on a water bath and degassed with nitrogen for one hour. Initiation was carried out by adding 2.25 ml of a 2% AZDN solution in methanol was added at the start and a further 2.5 ml after 2 hours, while maintaining a nitrogen blanket. The monomer was allowed to polymerise for 4 hours. The product was a viscous stable homogeneous solution having a solids content of 23.9% and a viscosity of 1325 cp.

EXAMPLE 2

A process broadly as in Example 1 was repeated but using a solution of 142.8 g 70% aqueous DMAEMA.QMeCl, 250 g 40% aqueous poly DADMAC and 274.2 g water. Polymerisation was initiated with 3 ml of the AZDN solution and was continued for 3 hours at 70° C. On cooling and standing overnight a stable solution was obtained having 33% solids and viscosity of 16,000 cP. As a comparison, when solutions of the poly DAD- MAC and poly DMAEMA.QMeCl of the corresponding concentrations were stirred together, the mixture quickly underwent phase separation.

EXAMPLE 3

A concentrated aqueous 50:50 blend of poly DADMAC and poly DMAEMA.QMeCl (made as in Example 2) was diluted in water to give 1% active concentration. 100 mls of this solution was tumbled for 1 hour with 2 gm Wyoming Bentonite 2–4 mm in size. There was very little swelling of the Bentonite and the aqueous phase was substantially clear. This shows the suitability of the blend for downhole clay stabilisation.

EXAMPLE 4

Into a double walled resin pot fitted with condenser, stirrer and thermometer were added 200 g of a 20% solution of homopolymer of DMAEMA.QMeCl (as the second polymeric material), 234 g water and 100 g of a 40% solution of ADTEP resin.

The mixture was warmed to 50° C. and 3 additions of epichlorohydrin made at 50° C. Thus 7.1 g epichlorohydrin was added over 20 minutes followed by 2 hr reaction time; 3.6 g epichlorohydrin was added over 3 minutes followed by 1 hr reaction time; and 10 g epichlorohydrin was added over 30 minutes followed by 30 minute reaction time.

After 30 minutes reaction time, 15 g of tetraethylene pentamine were added and the mixture increased in viscosity immediately. An addition of 150 g water was made and the product was allowed to re-thicken.

On reaching the required viscosity further cross linking was prevented by the addition of 35.5 g of 50% sulphuric acid. A final product was obtained at 700 cP with 21.3% solids.

EXAMPLE 5

Into a double walled resin pot fitted with condenser, stirrer and thermometer were added 75 g of 60% aqueous solution of dimethylamine, 188.8 g water and 42.1 g of 40% aqueous solution ADTEP resin, as the second polymeric material. 112.5 g epichlorohydrin were added with cooling at such a rate to maintain the temperature at 30° C. After addition of all the epichlorohydrin the temperature was raised to 60° C. and 30 g of tetraethylene pentamine were added after 2 hours. The viscosity increased immediately and 365 g of water were added to dilute the product, the product was allowed to re-thicken.

65.4 g 50% sulphuric acid added at the required viscosity to prevent cross linking. A final product was obtained at 730 cP at 28.7% solids.

EXAMPLE 6

An aqueous monomer solution was prepared containing aluminium sulphate as follows: 107.1 gms of acrylamide, 4.3 gms of adipic acid, 0.6 gms of a 40% solution of pentasodium diethylene triamine pentaacetate in water, 81.4 gms of 40% aqueous polyDADMAC and sufficient water to give 375.1 gms. were mixed together to form a clear solution and adjusted to pH 4.6.

An oil phase was prepared by mixing together 27.5 gms of a 30% solution in SBPll of an amphipathic copolymer of 2 moles of cetostearyl methacrylate with 1 mole of methacrylic acid, 7.5 gms of sorbitan mono-oleate, 139.6 gms of Pale Oil 60, 109.5 gms of SBPll and 0.04 gms of azobis-isobutyronitrile.

The aqueous monomer solution containing PolyDADMAC was homogenised into the oil phase to form an inverse emulsion. This was deoxygenated using nitrogen gas then polymerised over a 60 minute period using 4 mgms of tertiary butyl hydroperoxide and 4 mgms of sodium meta bisulphite. The resulting polymer solution was then distilled under reduced pressure to remove all volatile material resulting in an anhydrous dispersion of polymer containing polyDADMAC within its matrix. To this was added 17 gms of a 5 mole ethoxylate of nonyl phenol to render the dispersion emulsifiable in water. The intrinsic viscosity of the polymer was 8.5 dl.gm$^{-1}$.

EXAMPLE 7

The polymer/cationic additive mixture dispersion from Example 6 was tested for its improvement in paper sizing efficiency on emulsified alkenyl succinic anhydride sizing agent. They were compared to a standard polymer of the same intrinsic viscosity which did not acclude any cationic additive. The sizing formulation was:

| | |
|---|---|
| Size | 50 parts by weight |
| Emulsifier | 56 parts by weight |
| Dispersion | 20 parts by weight |
| and the furnish was: | |
| Bleached Kraft | 50% |
| Bleached Birch | 40% |
| Calcium carbonate | 10% |
| beaten to a freeness of 42° S.R. | |

The sizing results at 0.165 and 0.188% Active ASA on paper were as follows.

After preparing paper sheets, drying at elevated temperature, and conditioning 1 minute at ambient temperature:

| | Cobb Value (gm.m$^{-2}$) | |
|---|---|---|
| | 0.165 | 0.188 |
| Standard Polymer | 51 | 38 |
| Polymer + PDADMAC | 43 | 29 |

These results clearly show that replacing 20% of the polymer by a low molecular weight cationic additive results in equal if not better results on sizing efficiency.

EXAMPLE 8

A process similar to example 7 is conducted, except that it is performed as a bead polymerisation process instead of an emulsion process. Thus an aqueous solution of polyDADMAC is formed and is dispersed in the non-aqueous phase as droplets and methyl chloride quaternised dimethyl aminoethyl methacrylate is gradually added with stirring and polymerisation is initiated in conventional manner. The resultant dispersion of beads in non-aqueous liquid is dried by azeotropic distillation and the resultant dry beads are separated by centrifuging.

We claim:
1. A composition that comprises a blend of first and second water-soluble materials in a weight ratio 10:1 to 1:20 and in which
the first material is a water-soluble polymer selected from polymer types of the group (1a) polymers of dialkylaminoalkyl (meth) acrylates, (1b) polymers of dialkylaminoalkyl (meth) acrylamides, (1c) poly- mers of diallyldialkyl ammonium halides and (1d) polymers formed between an amine and epihalohydrin or dihaloalkane, and the second material is a water-soluble material that is selected from cationic polymers of a polymer type different from the polymer type of the first material and selected from polymer types of the group (2a) polymers of dialkylaminoalkyl (meth) acrylates, (2b) polymers of dialkylaminoalkyl (meth) acrylamides, (2c) polymers of diallyldialkyl ammonium halide, (2d) polymers formed from an amine and epihalohydrin or dihaloalkane, (2e) polyamides, and (2f) polyethylene imines, and the composition is a bulk aqueous concentrate having a combined concentration of the first and second materials of above 10% by weight and in which an aqueous solution of the said first and second materials in the concentration in the concentrate and obtained by mixing the materials exhibits incompatibility selected from phase separation and crystallization, and the composition is a stable homogeneous composition free of materials added to promote compatibility and has been made by a process comprising forming the first material by polymerisation from its monomeric starting material in a aqueous solution of the second material.

2. A composition according to claim 1 in which the first material is a polymer of type 1d and the second material is a polymer of type 2e.

3. A composition according to claim 1 in the form of an aqueous solution having a concentration of each of the first and second materials of above 2% and a combined concentration of at least 20% by weight.

4. A composition that comprises a blend of first and second water-soluble materials in a weight ratio 10:1 to :20 and in which the first material is a water-soluble polymer selected from polymer types of the group (1a) polymers of dialkylaminoalkyl (meth) acrylates, (1b) polymers of dialkylaminoalkyl (meth) acrylamides, and (1c) polymers of diallyldialkyl ammonium halides, and the second material is a water-soluble material that is selected from cationic polymers of a polymer type different from the polymer type of the first material and selected from polymer types of the group (2a) polymers of dialkylaminoalkyl (meth) acrylates, (2b) polymers of dialkylaminoalkyl (meth) acrylamides, (2c) polymers of diallyldiakyl ammonium halide, (2d) polymers formed from an amine and epihalohydrin or dihaloalkene, (2e) polyamides, and (2f) polyethylene immines, and the composition is a bulk aqueous concentrate having a combined concentration of the first and second materials of above 10% by weight and in which an aqueous solution of the said first and second materials in the concentrations in the concentrate and obtained by mixing the materials exhibits incompatibility selected from phase separation and crystallization, and the composition is a stable homogeneous composition free of materials added to promote compatibility and has been made by a process comprising forming the first material by polymerization from its monomeric starting material in an aqueous solution of the second material.

5. A composition according to claim 4 in which the first material is a polymer selected from types 1a and 1b.

6. A composition according to claim 4 in which the first material is a polymer of type 1a or type 1b having molecular weight above about 2 million and the second material is a polymer of types 2a to 2f with molecular weight below about 1 million.

7. A composition according to claim 4 in which the first material is a polymer of type 1a having molecular weight above about 1 million and the second material is a polymer of types 2c to 2f having molecular weight below about 700,000.

8. A composition according to claim 4 in which the first material is a polymer of dimethyl aminomethyl (meth) acrylate having molecular weight above about 1 million and the second material is a polymer of diallyl dimethyl ammonium chloride.

9. A method of making a composition that comprises a homogeneous blend of first and second water-soluble materials in a weight ratio 10:1 to 1:20 and in which the first material is a water-soluble polymer selected from polymer types of the group (1a) polymers of dialkylaminoalkyl (meth) acrylates, (1b) polymers of dialkylaminoalkyl (meth) acrylamides, (1c) polymers of diallyldialkyl ammonium halides and (1d) polymers formed between an amine and epihalohydrin or dihaloalkene, and the second material is a water-soluble material that is selected from cationic polymers of a polymer type different from the polymer type of the first material and selected from polymer types of the group (2a) polymers of dialkylaminoalkyl (meth) acrylates, (2b) polymers of dialkylaminoalkyl (meth) acrylamides, (2c) polymers of diallyldialkyl ammonium halide, (2d) polymers formed from an amine and epihalohydrin or dihaloalkene, (2e) polyamides, and (2f) polyethylene imines and the composition is a bulk aqueous concentrate having a combined concentration of the first and second materials of above 10% by weight and in which an aqueous solution of the said first and second materials in the concentrations in the concentrate and obtained by mixing the materials exhibits incompatibility selected from phase separation and crystallization, and the composition is a stable homogeneous composition free of materials added to promote compatibility, and in which the method comprises forming an aqueous solution of the second material and then forming the first material by polymerization from its monomeric starting material in the aqueous solution of second material.

* * * * *